C. T. Gladding,
Plaster Sower.

No. 112,583.  Patented Mar. 14, 1871.

Witnesses:
P. C. Dittmar
Wm. H. L. Smith

Inventor:
C. E. Gladding
per Munn & Co.
Attorneys.

United States Patent Office.

CHARLES E. GLADDING, OF TOWANDA, PENNSYLVANIA.

Letters Patent No. 112,583, dated March 14, 1871.

IMPROVEMENT IN PLASTER-SOWERS.

The Schedule referred to in these Letters Patent and making part of the same.

*To all whom it may concern:*

Be it known that I, CHARLES E. GLADDING, of Towanda, in the county of Bradford and State of Pennsylvania, have invented a new and useful Improvement in Plaster-Sower; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to furnish an improved machine for sowing plaster, which shall be simple in construction, effective, reliable, and uniform in operation, and easily adjusted to sow more or less to the acre, as may be desired; and It consists in the construction and combination of the various parts by means of which the plaster is distributed or sown.

A are the wheels, which revolve upon the journals of the axle B in the ordinary manner.

C are the shafts, which are securely and rigidly attached to the axle B.

D is the hopper or plaster-receiver, which is securely attached to the rear side of the axle B.

The hopper D is made V-shaped in its cross-section, and with vertical ends.

The forward side of the hopper is secured to the axle B, and the lower edge of said side projects below the lower edge of the rear side, to serve as a guard to prevent the discharge orifice from being wet by the grass or grain and becoming clogged with wet plaster.

The lower edge of the rear side of the hopper does not come quite down to the rear surface of the forward side of said hopper, a space being left for the escape of the plaster.

The size of the discharge-opening between the rear and front sides of the hopper is regulated by the plate E, which extends along the inner or forward surface of the rear side of the hopper D, and has rods or arms formed upon its ends which pass through slots in the ends of said hopper, and have screw-threads cut upon their outer or projecting ends to receive the nuts $e'$, by means of which the said plate is clamped in place when adjusted.

The plate E is pivoted to the lower ends of two or more arms F, the upper ends of which extend up along and are pivoted to the rear side-board of the hopper, so as to keep the plate E horizontal as it is moved up or down.

By this construction, by loosening one of the nuts $e'$ and tightening the other, the plate E will be raised to enlarge the discharge-opening, and by reversing the operation the said plate will be lowered to diminish said discharge-opening.

Figure 1:
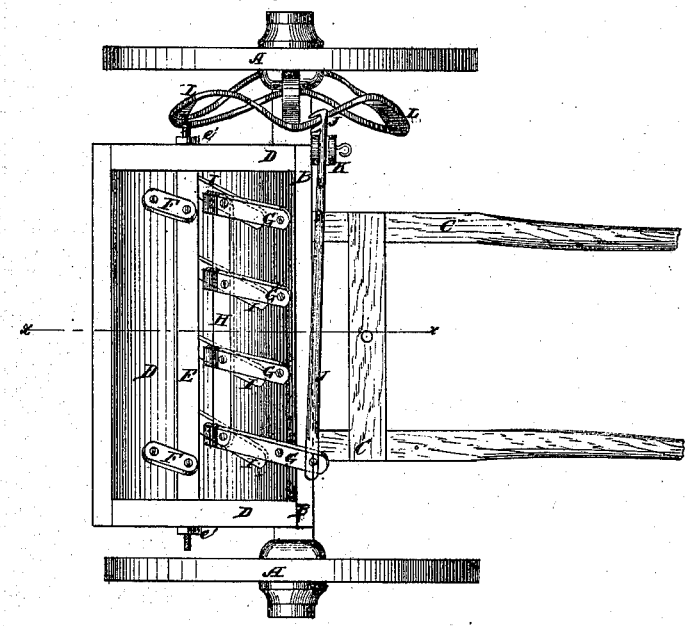
Figure 1 is a top view of my improved plaster-sower.
Figure 2:
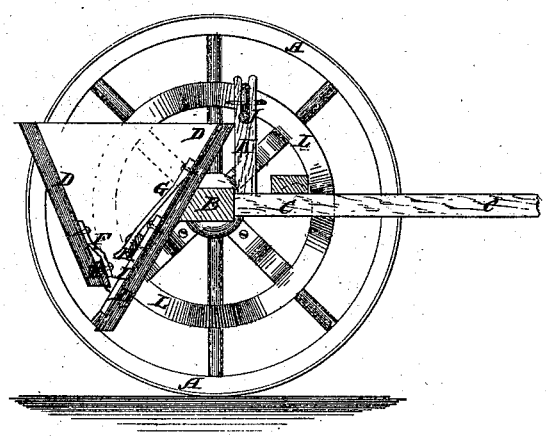
Figure 2 is a detail vertical section of the same taken through the line $x\ x$, fig. 1.

To the upper part of the inner surface of the forward side of the hopper D are pivoted the upper ends of a number of bars, G, the lower ends of which extend nearly to the discharge-opening in the bottom of said hopper, and are bent outward, as shown in figs. 1 and 2, so as to point toward the adjustable plate E.

The bars G are connected, held in their proper relative positions, and made to move together, by the bar H, which extends longitudinally along the inner surface of the lower part of the forward side of the hopper, and to which the said bars G are pivoted.

I are bars, which are pivoted to the bars H by the same rivets or pivots that pivot the bars G to said bars H.

The bars I are pivoted to the inner surface of the forward side of the hopper D, and their lower ends project through the discharge-opening in the bottom of the hopper.

The upper end of one of the bars G is extended upward above the upper edge of the hopper, and to its projecting end is pivoted the connecting-rod J, the outer part of which passes through and is pivoted to an upright, K, the lower end of which is pivoted to the axle B.

Upon the outer end of the rod J are formed jaws to receive the rim of the cam-wheel L, which is attached to one of the wheels A, so that as the machine is drawn forward the revolution of the cam-wheel L may operate the bars G and I to insure the continuous and uniform discharge of the plaster.

Having thus described my invention,

I claim as new and desire to secure by Letters Patent—

1. The combination of the pivoted bars G, connecting-bar H, pivoted bars I, connecting-rod J, pivoted support K, and cam-wheel L with each other and with the drive-wheel A, axle B, and hopper D, substantially as herein shown and described, and for the purpose set forth.

2. The combination of the adjustable plate E, clamping-nuts $e'$, and pivoted arms F with the discharge-opening in the bottom of the hopper D, when used in connection with the pivoted arms or bars G and I, substantially as herein shown and described, and for the purpose set forth.

CHARLES E. GLADDING.

Witnesses:
W. T. DAVIS,
C. L. LAMB.